(12) United States Patent
Carrabis

(10) Patent No.: US 9,064,012 B2
(45) Date of Patent: Jun. 23, 2015

(54) WEB ANALYTICS SYSTEM AND METHOD

(76) Inventor: Joseph Carrabis, Nashua, NH (US)

(*) Notice: Subject to any disclaimer, the term of this patent is extended or adjusted under 35 U.S.C. 154(b) by 958 days.

(21) Appl. No.: 13/022,884

(22) Filed: Feb. 8, 2011

(65) Prior Publication Data

US 2012/0203889 A1 Aug. 9, 2012

(51) Int. Cl.
*G06F 15/173* (2006.01)
*G06F 17/30* (2006.01)

(52) U.S. Cl.
CPC .............................. *G06F 17/30861* (2013.01)

(58) Field of Classification Search
CPC ................... H04L 29/08567; H04L 41/0246; H04L 41/0253
USPC ........ 709/220–236, 203, 217, 200; 705/1–25; 707/736
See application file for complete search history.

(56) References Cited

U.S. PATENT DOCUMENTS

2008/0300909 A1* 12/2008 Rikhtverchik et al. ........... 705/1
2009/0271514 A1* 10/2009 Thomas et al. ............... 709/224

* cited by examiner

Primary Examiner — El Hadji Sall
(74) Attorney, Agent, or Firm — Hayes Soloway, PC

(57) ABSTRACT

A web analytics system and method is provided. Generally, the system contains a collection element collecting browser information associated with a web page, wherein the browser information is collected into a string variable. A tag creation element creates a first tag and a second tag within the web page. A naming element names a tag source of the first tag with the string variable having the browser information. A record of the web page is established at the server, wherein a script is returned as the named tag source and arrives with an identifier for a visit or a visitor of the web page. At least a portion of the browser information is flushed to the server, wherein the portion of the collected browser information is initiated based on at least one of a length of the string variable and an elapsed time between at least two mouse movements.

20 Claims, 4 Drawing Sheets

WEB ANALYTICS SYSTEM AND METHOD

FIELD OF THE DISCLOSURE

The present disclosure is generally related to web analytics and more particularly is related to a web analytics system and method for data gathering.

BACKGROUND OF THE DISCLOSURE

Web analytics is a common method for understanding and optimizing web usage, and includes measuring, collecting, analyzing and reporting web usage data. Web analytics can be a tool for business research and market research. A variety of different programs may run analytics applications that can provide data on the number of visitors, page views, the time spent on a page by a user and locations of clicks with a mouse to gauge the popularity of the sites which will contribute to the market research.

There are two common ways to collect data for web analytics. One way is a logfile analysis, which reads the logfiles in which a web server records all of the transactions that take place on the web server. The other way is a page tagging method that uses JavaScript embedded on a web page to notify a third-party server when a page is rendered by a web browser. Both methods are capable of collecting data concerning a user's use of a web page, which can later be used to produce web traffic reports.

FIG. 1 is a schematic illustration of a system 10 for gaining analytical information about a web page, in accordance with the prior art. The system 10 includes a client 20 in communication with a first server 40 and a second server 50. The client 20 may request a web page having text as well as embedded images from the first server 40. This may be done with a request element 22, wherein the text and embedded images are fetched and rendered. This includes fetching the resource associated with the embedded image tag on the second server 50, resulting in an execution of a first CGI script 52, embedded within the image. The request element 22 may make any type of request, such as requesting documents, images or requesting a resource using an embedded image or image tag. The web page also contains embedded URLs that point to two resources on the second server 50. The first CGI script 52 can capture information about the client 20, such as Network ID or Client ID, and may also return a transparent image.

The second server 50 also contains a Java applet, or an applet from another type of computer software stored on the second server 50. The client 20 automatically fetches the code and downloads it. The code is initialized in an initializing element 24 and then the start operation of the applet begins in a start element 26. After initialization but before a start process, the applet may contact the second server 50 at a second CGI script 54 to obtain additional resources that the applet needs to display images, play sounds or control a look or behavior. The additional resources may be previously constructed historical database profiles, which can be selected by the code based on Network and/or Client ID, the URL of the web page, and a previously constructed client profile.

Once fully initialized, the code applet notes a start time and then monitors a user's actions with monitoring element 28. This includes monitoring mouse clicks or keyboard entries. While monitoring the user's actions, the system 10 does not have any communication with either the first server 40 or the second server 50. This occurs until a stop element 30 is executed, such as when the user leaves the web page, open a new web page, or takes some other action to initiate a stop procedure. A stop time is noted by the stop element 30 and a calculation element 32 calculates the difference between the stop time and the start time. This calculation is sent to a third CU script 56 in the second server 50 for storage and analysis. The third CGI script 56 captures data associated with the client 20 and saves it in a database 58. The data remains in the database 58 ready to be used for web analytical purposes.

However, these current and conventional methods are limited in how much information can be gathered, the types of information that can be gathered, and the response time in which the information can be used for web analytical purposes. These limitations hinder the full capabilities of processing analytical information capable of yielding data that can be used more effectively. Thus, a heretofore unaddressed need exists in the industry to address the aforementioned deficiencies and inadequacies.

SUMMARY OF THE DISCLOSURE

Embodiments of the present disclosure provide a system and method for web analytics. Briefly described, in architecture, one embodiment of the system, among others, can be implemented as follows. The system contains a collection element for collecting browser information associated with a web page, wherein the browser information is collected into a string variable. A tag creation element creates at least a first tag and a second tag within the web page. A naming element names a tag source of the first tag with the string variable having the collected browser information, wherein the collected browser information is attached as a querystring processable by a server. A record of the web page is established at the server, wherein a script is returned as the named tag source and arrives with an identifier for at least one of a visit and a visitor of the web page and at least a portion of the collected browser information is flushed to the server by setting a tag source of the second tag, wherein the at least a portion of the collected browser information is initiated based on at least one of a length of the string variable and an elapsed time between at least two mouse movements.

The present disclosure can also be viewed as providing methods of collecting web analytical data. In this regard, one embodiment of such a method, among others, can be broadly summarized by the following steps: collecting browser information associated with a web page into a string variable; creating at least a first tag and a second tag in the web page; naming a tag source of the first tag with the string variable having the collected browser information, wherein the collected browser information is attached as a querystring processable by a server; establishing a record for the web page at the server, wherein a script is returned as the named tag source and arrives with an identified for at least one of a visit and visitor of the web page; and flushing at least a portion of the collected browser information to the server by setting a tag source of the second tag, wherein the at least a portion of the collected browser information is initiated based on at least one of a length of the string variable and an elapsed time between at least two mouse movements.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
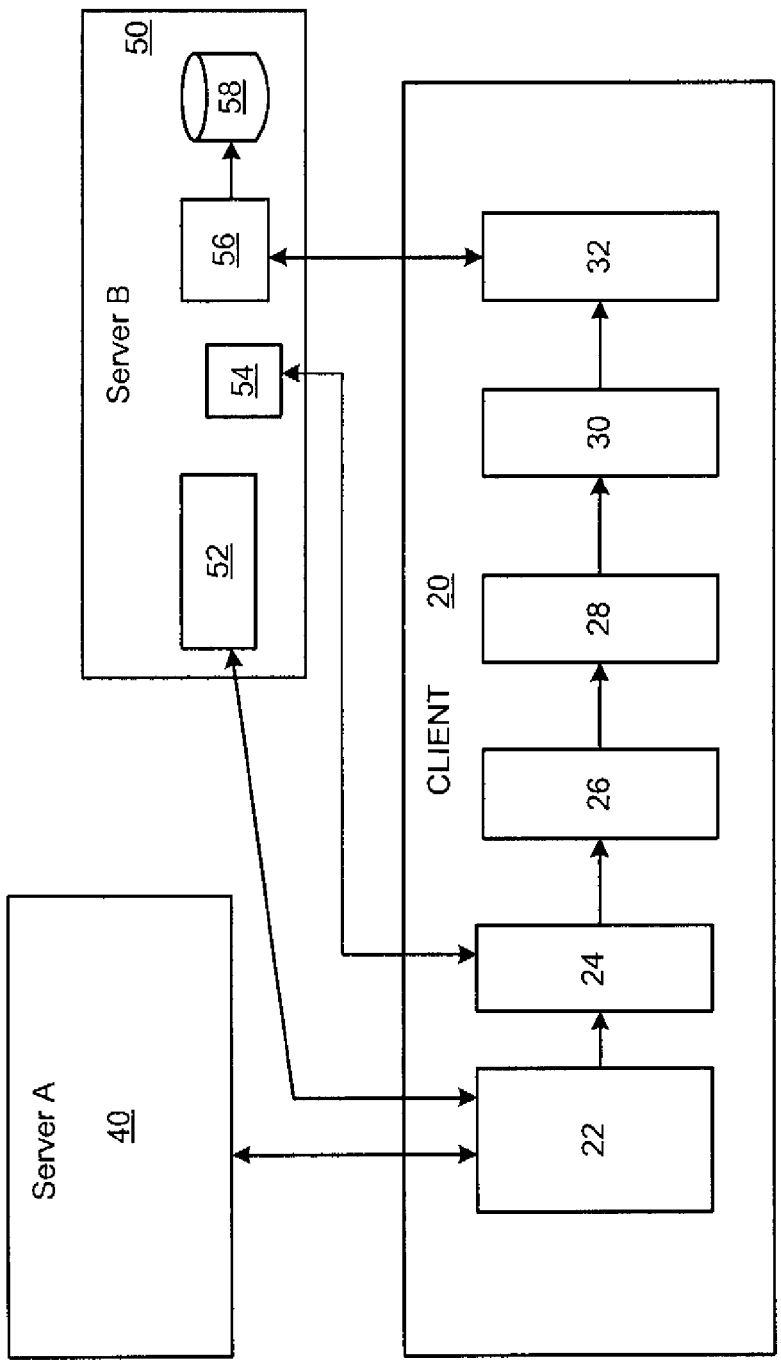
FIG. 1 is a schematic illustration of a system for gaining analytical information about a web page, in accordance with the prior art.
Figure 2:
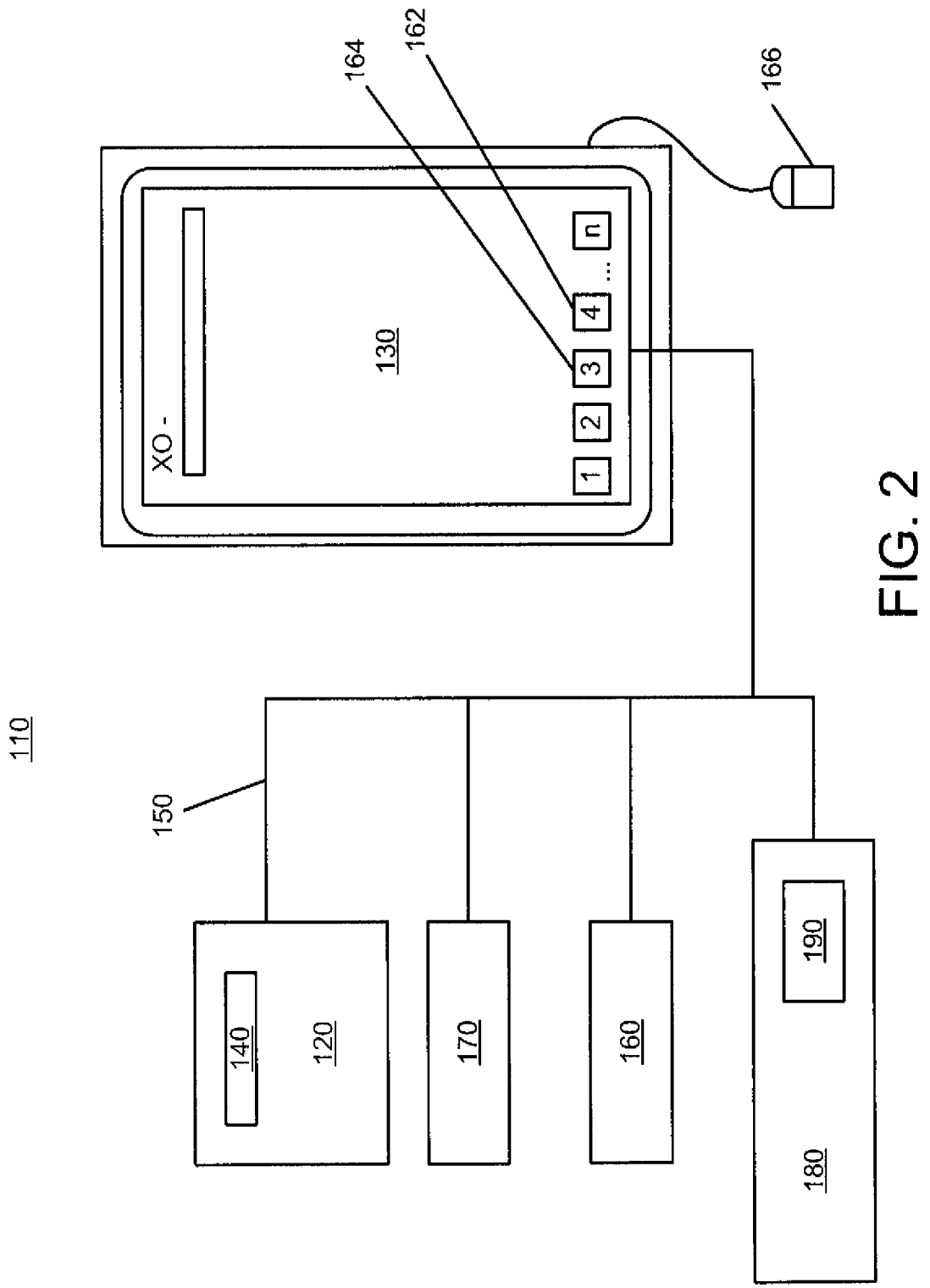
FIG. 2 is a schematic diagram illustrating the web analytics system in accordance with a first exemplary embodiment of the disclosure.

FIG. 2 is a schematic diagram illustrating the web analytics system 110 in accordance with a first exemplary embodiment of the disclosure. The web analytics system 110, includes a collection element 120 that may collect browser information, or other information associated with at least one web page 130. The browser information may be collected into a string variable 140 through a communication system 150. A tag creation element 160 is connected to the communication system 150 and may create at least a first tag 162 and a second tag 164 within the web page 130. A naming element 170 is connected to the communication system 150 and names a tag source of the first tag 162 with the string variable 140 having the collected browser information The collected browser information may be attached as a querystring, which is processable by a server 180. A record 190 of the web page 130 is established at the server 180, wherein a script is returned as the named tag source and arrives with an identifier for at least one of a visit and a visitor of the web page 130 and at least a portion of the collected browser information is flushed to the server 180 by setting a tag source of the second tag 164. At least a portion of the collected browser information is initiated based on at least one of a length of the string variable and an elapsed time between at least two mouse movements.

Browser information will pertain to a user's interaction with a web page 130 through a computer input device. A user's interaction with a web page 130 is generally limited to the inputs that the web page 130 has, which is limited to the input devices in communication with the computer facilitating the web page. These input devices include a mouse 166 or another pointing device, a keyboard, a touch screen, an input drive, oral commands or any other device or mechanism used within the field. Preferably, the user will use a mouse 166 to interact with the web page 130 by directing the mouse 166 and cursor across the web page 130 in one of an infinite number of various paths. Accordingly, the browser information collected may be from tracking a path of a cursor across the web page 130, where the path of the cursor is controlled by a user of the web page 130.

While success is achieved in the system when other browser information is collected, such as start/stop times and cursor locations, the system 110 may also yield successful results when tracking only the path of the cursor movement. In other words, the system 110 does not need to track the cursor's location with respect to the web page 130 or particular features of the web page, such as images and links, but only the path of the cursor movement and/or the path of the cursor movement as a function of time. Similarly, the system 110 may also track mouse movements as a function of time and movement, time and location, time and velocity and time and acceleration.

The browser information that is collected may be based on a variety of information that provides analytical data. In accordance with the first exemplary embodiment, the collected browser information is based on a length of the string variable, an elapsed time between at least two mouse 166 movements, or a combination thereof. As browser information is collected, it is entered into a string variable 140 within the collection element 120. The string variable 140 has a capacity for information that it can facilitate, and when that capacity is reached, an additional string variable may be initiated. Throughout use of the system 110, a plurality of string variables 140 may be initiated and filled with collected browser information. The filled string variables 140 are flushed to the server 180 as they become filled, thereby facilitating the collection and flushing of browser data in a repeatable manner where flushing occurs intermittently throughout use of the system 110. For example, the filled string variables 140 may be flushed before a user leaves a web page 130, which may allow the system 110 to respond to the activity of the user, such as mouse movements of the user. This may happen in real-time, or near real-time, which may include flushing the string variables 140 within a fraction of a second after the string variable 140 is filled, such as within 0.01 seconds, 0.1 seconds and 1.0 seconds, to name a few. It is noted that within this disclosure, a filled string variable 140 may include any size or quantity of information and may be considered filled when it reaches a certain length.

The system 110 may also be capable of monitoring a bounce page visitor, or someone who comes to the web page 130 from a search engine or link and leaves before navigating within the web page 130 further. The system 110 may indicate that the bounce page visitor was present, but may also monitor what activity occurred while the bounce page visitor was interacting with the web page 130. For example, the system 110 may monitor what mouse movements occurred from the time the bounce page visitor started interacting with the web page 130 until the time the bounce page visitor leaves the web page 130. Since the system 110 monitors activity in an expedient manner, the system 110 can intercept a bounce page visitor who is about to leave the web page 130. This may occur through a variety of ways, such as by routing the bounce page visitor to another portion of the web page 130 or by sending a communication such as a pop-up message.

The browser information that is collected may also be flushed based on a sensed activity of the web page 130 user, such as an elapsed time between mouse 166 movements or information associated with the movements of the mouse 166, such as the time in which a mouse 166 is moved or not moved. Within this disclosure, it is noted that reference to a mouse 166 movement will correspond to a cursor movement on the web page. When a mouse 166 has sat idle for a certain length of time, the string variable 140 having the collected browser information may be flushed to the server. For example, a user who does not move the mouse 166 for 3 seconds may trigger the string variable 140 to be flushed. The amount of time to trigger a flushing can vary, depending on design, and may include a fraction of a second, 1 second, 2 seconds, 3 seconds, 5 seconds, or any other period of time.

The system 110 may facilitate the collection of browser information for any period of time, such as a few seconds when a user is viewing a web page 130, or a few minutes or hours, depending on the user's actions. As the quantity of browser information is collected, a plurality of consecutively used string variables 140 may be filled and flushed to the server 180. The cycle of collecting browser information, filling a string variable 140 and flushing the browser information to the server 180 may continue for any length of time as the user interacts with the web page 130. This may result in a substantially continuous uploading of browser information to the server 180, which may translate into a continuous steam of information associated with the user's interaction on the web page 130.

As the string variables 140 are uploaded to the server, the system may change the tag source of the second tag 164 as needed. The string variable 140 may be entered as at least a portion of a file name when the tag source of the second tag 164 is set. The first or second tag, 162, 164 may include any type of tag used within the field, and will preferably be an .img tag (<img>). When the browser information arrives at the server 180, the string variable 140 may be parsed and added to a record database 190 within the server 180. The server 180 may include more than one server 180, such as a server 180 located remotely from the system 110. For example, the browser information may be collected and sent to a server 180 that is operated remotely, such as a server 180 operated by an entity other than the user of the system 110.

The system 110 may execute one final flushing of the browser information in the string variable 140 when an onunload event is executed of fired. An onunload event may include situations where the user moves on to or opens a new web page 130 or the web page 130 browser is closed, thereby closing the web page 130, among others. This may be characterized as a final step that the system 110 carries out to flush any remaining collected browser information to the server 180.

As one having ordinary skill in the art would understand, any of the components of the system 110 discussed herein may be embodied in a computer readable medium, or on a processor of a computerized device. The computerized device may include any type of device, including a PC, a Mac, a smart phone, an interactive TV, a video gaming system or similar device. The collection element 120, naming element 170 and tag creation element 160 are illustrated as distinct components in FIG. 2. However any portion of these components may be housed within one or more computerized devices.

The communication system 150 connects the various components of the system 110, thereby allowing data and information to be transmitted, shared or communicated between components. The communication system 150 may include any system of communication that is known within the art. This may include a hard-wired communication system, a wireless communication system, communication via microchip, or any combination thereof. The communication system 150 may also include any other features that are known within the industry.

Once the browser information is flushed to the server 180, it may be used for a variety of analytical purposes, such as determining or estimating the number of users of a web page 130, a characteristic about the user, or the like. For example, the collected and flushed browser information may contain data that is used to generate information about the gender, demographic, age or a state of mind, such as confusion, of a user of a web page 130. When this information is provided in a continuous manner, it can provide near-real time data about the user of the web page 130, which may be used to specifically tailor content on the web page 130 to that particular user. This occurs before an onunload event, and thus before the user leaves the web page 130, closes the web page 130 or otherwise ceases to interact with it. Further, this may be carried out according to the particular interests of a company or business, or to obtain a particular result or outcome.

Figure 3:
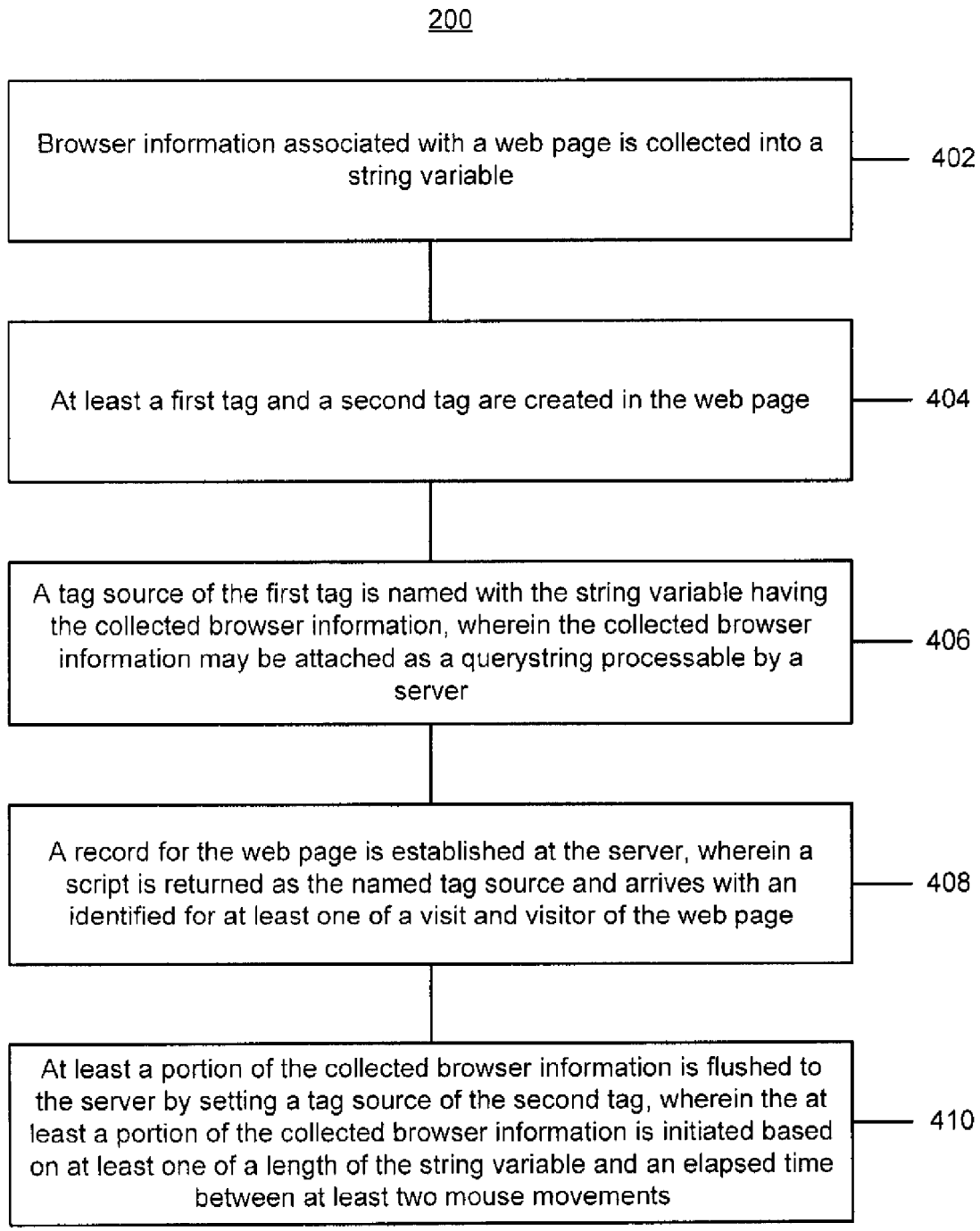
FIG. 3 is a flowchart illustrating a method of collecting information associated with a web page, in accordance with the first exemplary embodiment of the disclosure.

FIG. 3 is a flowchart 200 illustrating a method of collecting information associated with a web page, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 402, browser information associated with a web page is collected into a string variable. At least a first tag and a second tag are created in the web page (block 404). A tag source of the first tag is named with the string variable having the collected browser information, wherein the collected browser information may be attached as a querystring processable by a server (block 406). A record for the web page is established at the server, wherein a script is returned as the named tag source and arrives with an identified for at least one of a visit and visitor of the web page (block 408). At least a portion of the collected browser information is flushed to the server by setting a tag source of the second tag, wherein the at least a portion of the collected browser information is initiated based on at least one of a length of the string variable and an elapsed time between at least two mouse movements (block 410)

The method of collecting information associated with a web page may also include collecting browser information associated with the web page into a plurality of consecutively used string variables, which may be used to update web pages in real-time, or near real time. This may include browser information that is collected from tracking a path of a cursor across the web page, where a user of the web page controls the path of the cursor. Accordingly, the method of collecting information associated with a web page may also include changing the tag source of the second tag. This may include entering the string variable as at least a portion of a file name. This may be done in a cyclical or continuous fashion, wherein browser information is continually collected into a string variable during each cycle and the tag source of the second tag is changed with each cycle or iteration. When the string variable arrives at the server, it may be parsed and added into a record database associated with the web page, having a record of visits and/or visitors to the web page.

At a point in time, an onunload event will occur as the user or visitor of a web page will cease interaction with the web page. An onunload event may include situations where the user moves on to or opens a new web page or the web page browser is closed, thereby closing the web page, among others. Upon firing or initiating an onunload event, a final flush of the collected browser information may be executed. This will flush any remaining collected browser information to the server, which may be a completion of the method with that particular web page.

Figure 4:
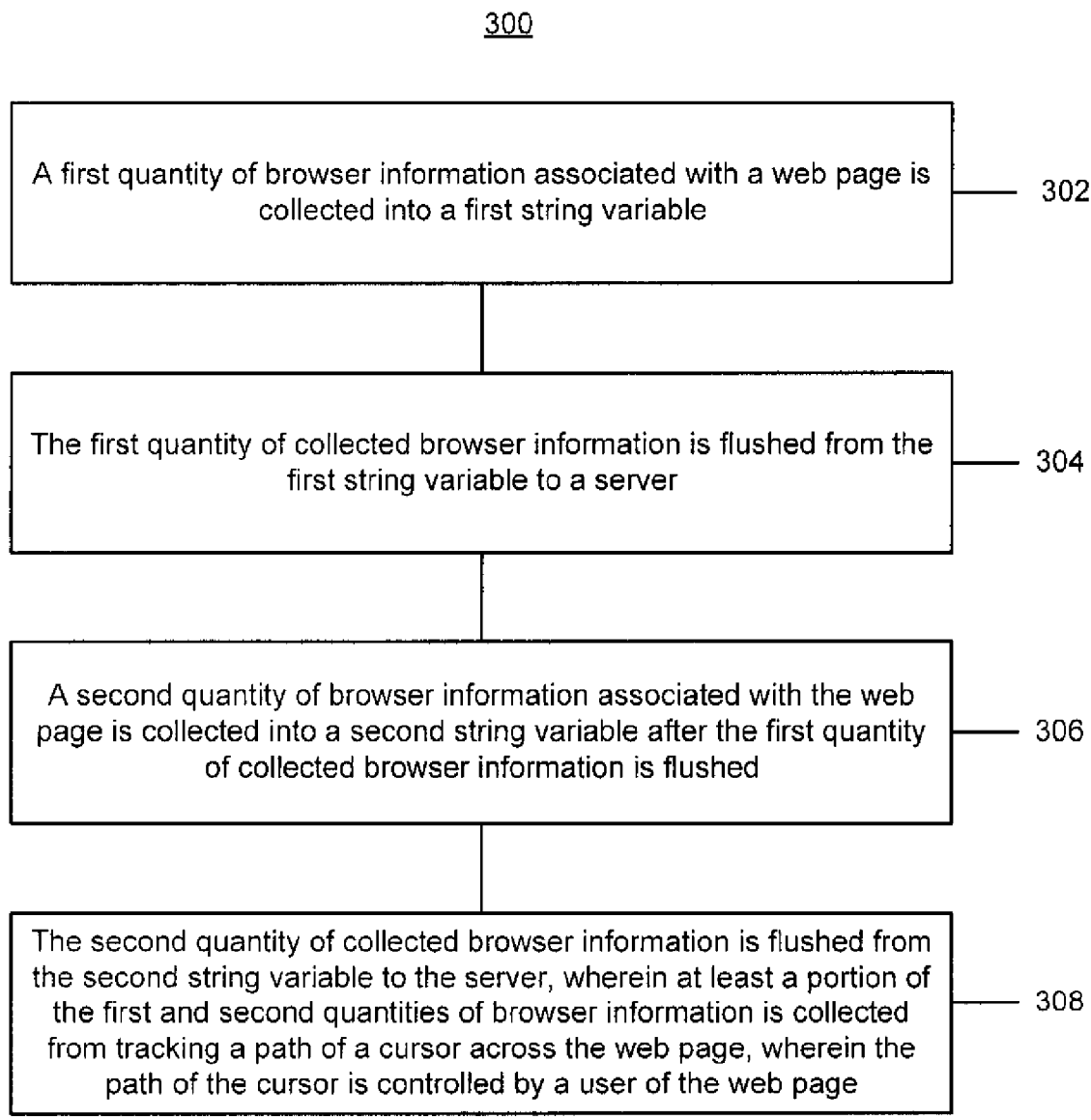
FIG. 4 is a flowchart illustrating a method of collecting web-based analytical information, in accordance with a second exemplary embodiment of the disclosure.

FIG. 4 is a flowchart 300 illustrating a method of collecting web-based analytical information, in accordance with a second exemplary embodiment. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown at block 302, a first quantity of browser information associated with a web page is collected into a first string variable. The first quantity of collected browser information is flushed from the first string variable to a server (block 304). A second quantity of browser information associated with the web page is collected into a second string variable after the first quantity of collected browser information is flushed (block 306). The second quantity of collected browser information is flushed from the second string variable to the server, wherein at least a portion of the first and second quantities of browser information is collected from tracking a path of a cursor across the web page, wherein the path of the cursor is controlled by a user of the web page (block 308). Flushing any of the first and second quantities of collected browser information may be initiated based on at least one of a length of at least one of the first and second string variables and an elapsed time between at least two cursor movements.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A web analytics device comprising:
   a processor and a non-transitory computer readable medium, the non-transitory computer readable medium having:
      a collection element collecting browser information associated with a web page, wherein the browser information is collected into a string variable;
      a tag creation element, creating at least a first tag and a second tag within the web page;
      a naming element, naming a tag source of the first tag with the string variable having the collected browser information, wherein the collected browser information is attached as a querystring processable by a server; and
      a record of the web page established at the server, wherein a script is returned as the named tag source and arrives with an identifier for at least one of a visit and a visitor of the web page and at least a portion of the collected browser information is flushed to the server by setting a tag source of the second tag, wherein the flushing of the at least a portion of the collected browser information is initiated based on at least one of a length of the string variable and an elapsed time between at least two mouse movements.

2. The system of claim 1, wherein the browser information associated with the web page is collected into a plurality of consecutively used string variables.

3. The system of claim 1, wherein the tag source of the second tag is changed while the visitor remains on the web page.

4. The system of claim 1, further comprising a record database associated with the web page, wherein the string variable is parsed and added to the record database.

5. The system of claim 1, further comprising an onunload event, wherein a final flush of the collected browser information occurs when the onunload event is fired on the web page.

6. The system of claim 5, wherein the onunload event includes at least one of opening a second web page and closing the web page.

7. The system of claim 1, wherein the string variable is entered as at least a portion of a file name when the tag source of the second tag is set.

8. The web analytics system of claim 1, wherein at least one of the first tag and second tag is an <img> tag.

9. The web analytics system of claim 1, wherein the browser information collected is at least one mouse movement.

10. The web analytics system of claim 1, wherein the browser information collected is from tracking a path of a cursor across the web page, wherein the path of the cursor is controlled by a user of the web page.

11. A method of collecting information associated with a web page, the method comprising:
   collecting browser information associated with a web page into a string variable using a processor;
   creating at least a first tag and a second tag in the web page;
   naming a tag source of the first tag with the string variable having the collected browser information, wherein the collected browser information is attached as a querystring processable by a server;
   establishing a record for the web page at the server, wherein a script is returned as the named tag source and arrives with an identifier for at least one of a visit and visitor of the web page; and
   flushing at least a portion of the collected browser information to the server by setting a tag source of the second tag, wherein the flushing of the at least a portion of the collected browser information is initiated based on at least one of a length of the string variable and an elapsed time between at least two mouse movements.

12. The method of claim 11, further comprising the step of collecting browser information associated with the web page into a plurality of consecutively used string variables.

13. The method of claim 11, wherein the step of flushing at least a portion of the collected browser information to the server by setting the tag source of the second tag further comprises changing the tag source of the second tag.

14. The method of claim 11, further comprising the step of parsing and adding the string variable info a record database associated with the web page.

15. The method of claim 11, further comprising the step of executing a final flush of the collected browser information when an onunload event is fired on the web page.

16. The method of claim 15, wherein an onunload event further comprises at least one of opening a second web page and closing the web page.

17. The method of claim 11, wherein the step of setting the tag source of the second tag includes entering the string variable as at least a portion of a file name.

18. The method of claim 11, wherein the browser information collected is from tracking a path of a cursor across the web page, wherein the path of the cursor is controlled by a user of the web page.

19. A method of collecting web-based analytical information, the method comprising:

collecting a first quantity of browser information associated with a web page into a first string variable using a processor;

flushing the first quantity of collected browser information from the first string variable to a server;

collecting a second quantity of browser information associated with the web page into a second string variable after the first quantity of collected browser information is flushed; and flushing the second quantity of collected browser information from the second string variable to the server, wherein at least a portion of the first and second quantities of browser information is collected from tracking a path of a cursor across the web page, wherein the path of the cursor is controlled by a user of the web page.

20. The method of claim 19, wherein flushing at least one of the first and second quantities of collected browser information is initiated based on at least one of a length of at least one of the first and second string variables and an elapsed time between at least two cursor movements.

* * * * *

UNITED STATES PATENT AND TRADEMARK OFFICE
CERTIFICATE OF CORRECTION

| | | |
|---|---|---|
| PATENT NO. | : 9,064,012 B2 | Page 1 of 1 |
| APPLICATION NO. | : 13/022884 | |
| DATED | : June 23, 2015 | |
| INVENTOR(S) | : Joseph Carrabis | |

It is certified that error appears in the above-identified patent and that said Letters Patent is hereby corrected as shown below:

IN THE CLAIMS

Col. 8, Claim 14, Line 51, "info" should be --into--.

Signed and Sealed this
Tenth Day of November, 2015

Michelle K. Lee
*Director of the United States Patent and Trademark Office*